OSCILLATORY CIRCUIT FOR ELECTRO-ACOUSTIC CONVERTER at $f_2$ $X_L = X_{Co}$
and $X_{Lp} = X_{Cp}$ ANDREW SHOH
INVENTOR.
BY:
Ervin B. Steinberg at $f_2$ $X_{L'} = X_{Ce+Co}$
and $X_{Lp} = X_{Cp}$ at $f_2$ $X_{L'} = X_{Co'}$
whereby $X_{Co'} = \frac{X_{Co} \times X_{Ce}}{X_{Co} + X_{Ce}}$

ANDREW SHOH
INVENTOR.

BY: Ervin B. Steinberg at $f_2$ : $X_L = X_C$

ANDREW SHOH
INVENTOR.

BY:
Ervin B. Steinberg

ANDREW SHOH
INVENTOR.
BY:
Ervin B. Steinberg

ANDREW SHOH
INVENTOR.
BY:

United States Patent Office 3,432,691
Patented Mar. 11, 1969

3,432,691
OSCILLATORY CIRCUIT FOR ELECTRO-ACOUSTIC CONVERTER

Andrew Shoh, Ridgefield, Conn., assignor to Branson Instruments, Incorporated, Stamford, Conn., a corporation of Delaware Filed Sept. 15, 1966, Ser. No. 579,673
U.S. Cl. 310—8.1 20 Claims
Int. Cl. H02n 11/00

This invention relates to an oscillatory circuit for driving an electro-acoustic converter which is subjected to loads of greatly varying acoustic impedance. More specifically, this invention refers to an automatic self-regulating system and apparatus for delivering acoustic power to a load, the power transfer to the load being a function of the mechanical impedance of the load while the energy dissipated in the converter remains substantially constant. Quite specifically, this invention concerns an oscillatory circuit for driving an electro-acoustic converter substantially at its natural mechanical open circuit resonant frequency condition, the circuit being operated from a constant voltage supply, and the power dissipated in the converter remaining substantially constant while the power transferred to the load may vary over wide limits.

In recent years, sonic energy has found wide use in science and industry for cleaning, soldering, welding, material treatment, homogenizing, dispersing, microbiological cell disruption and the like. The sonic energy necessary to accomplish such tasks is generated most commonly by means of magnetostrictive or piezoelectric transducers which convert high frequency electrical energy to mechanical vibrations. When the mechanical or acoustic energy so produced is to be concentrated and increased in amplitude, the transducer is fitted with a concentrating horn or acoustic impedance transformer to provide at the end of the horn extremely high-power densities per unit area. This highly concentrated acoustic power is then eminently suited for such ultrasonic high power process application, as for instance, homogenizing, biological cell disruption, ultrasonic welding, soldering and treatment of materials and the like.

One of the problems encountered in operating such high-power sonic converters, is that when the converter is fed with electrical energy and the tip of the concentrating horn is not coupled to any medium except air, the tip of the horn vibrates violently at very large amplitudes. Very little power is transferred to the air and substantially all of the power supplied to the converter must be dissipated therein. In contrast therewith, when the tip of the concentrating horn is coupled to a less compliant medium, such as a liquid, energy transfer occurs from the horn to such a medium, thus leaving a smaller amount of energy to be dissipated in the converter. Depending upon the efficiency of the converter, the medium which receives the acoustic power and the degree of coupling achieved, the power to be dissipated in the converter may vary over a ratio of 10 to 1 from the condition of no power transfer to the load, to the other condition when good power transfer from the horn to the load is achieved.

In order to protect the transducers from the possibility of destruction by excessive power dissipation, the prior art employs principally two approaches. One method is to limit the power supplied to the converter to the amount of power which the converter safely can dissipate under the condition of no power transfer. As is readily apparent, this approach seriously limits the power which is available to the converter when good power transfer between the horn and the load is achieved. The other approach concerns the provision of manually adjustable power control means, for instance selectable voltage levels, in order to vary the power applied to the converter. This latter method is not satisfactory since the operator must judge the degree of power transfer and, in the event that too much power is applied to the converter, or if the converter is uncoupled from the load and inadvertently left to operate into air without power reduction, the converter may destroy itself. Still further, the necessity for manual adjustments is completely inadequate when the converter is used in high-speed production where the load impedance can change rapidly from one workpiece to the next.

The invention described hereafter concerns a method and means for automatically controlling the power which is supplied to an electro-acoustic converter as a function of the acoustic power transfer between the concentrating horn of the converter and the load. Thus, under the conditions when there is no substantial power transfer between the horn and the load, the converter receives only a small amount of power. As the power transfer increases, increased power is supplied to the converter, maintaining the power dissipated in the sonic converter substantially constant. This is accomplished by providing an electric circuit which operates the electro-acoustic converter in such a manner as to maintain the "motional" voltage component applied across the converter substantially constant. Therefore, the horn will vibrate substantially to the same degree whether the converter is coupled to air, representing the condition of no power transfer, or whether the converter is coupled to a high impedance load, representing the condition of very effective power transfer. Under those operating conditions, the power dissipated in the converter remains substantially constant.

The above described operating condition, as has been found, can be achieved by relatively simple oscillatory circuits which are connected to a standard power line, providing substantially constant voltage, and which cause the electro-acoustic converter, particularly one having piezoelectric transducing means, to resonate at or near its natural mechanical open circuit resonant frequency, such frequency being defined as the frequency at which the converter will resonate with its electrical terminals open circuited. Since in this mode of operation the mechanical constants of the converter are represented by the parallel electric components of resistance, and tuned inductance and capacitance, the open circuit resonant frequency condition will also be referred to as the frequency of "parallel resonance."

One of the principal objects of this invention is therefore the provision of a new and improved circuit for operating an electro-acoustic converter.

Another object of this invention is to provide an oscillatory circuit for keeping the power dissipation in an electro-acoustic converter substantially constant or below a predetermined maximum value irrespective of the mechanical impedance of the load.

A further object of this invention is to provide an oscillatory circuit which is operable from a constant voltage supply and which delivers variable amounts of power to a load coupled thereto.

Still another and further object of this invention is to provide automatic methods, apparatus and systems for operating an electro-acoustic converter substantially at its open circuit resonant frequency ("parallel resonance"), operating the converter under various conditions of the load while maintaining the power dissipation in the converter substantially constant, and coupling the converter to a conventional voltage source.

To this end, the invention discloses an oscillatory circuit which comprises a load circuit which includes an electro-acoustic converter having a predetermined natural frequency of oscillation and exhibiting a capacitive reactance at said natural frequency; a driving circuit coupled to said load circuit and including a source of direct current, a switching means for providing pulses of energy from said source and the series connection of an inductance and a capacitance, said inductance providing an inductive reactance which subsequentially equals at the parallel resonant frequency of the converter the capacitive reactance of said driving circuit and that of said load circuit as reflected in said driving circuit; and a feedback circuit coupled to said switching means for applying thereto an alternating current signal which substantially is in phase with the resistive voltage component across the converter.

Figure 1:
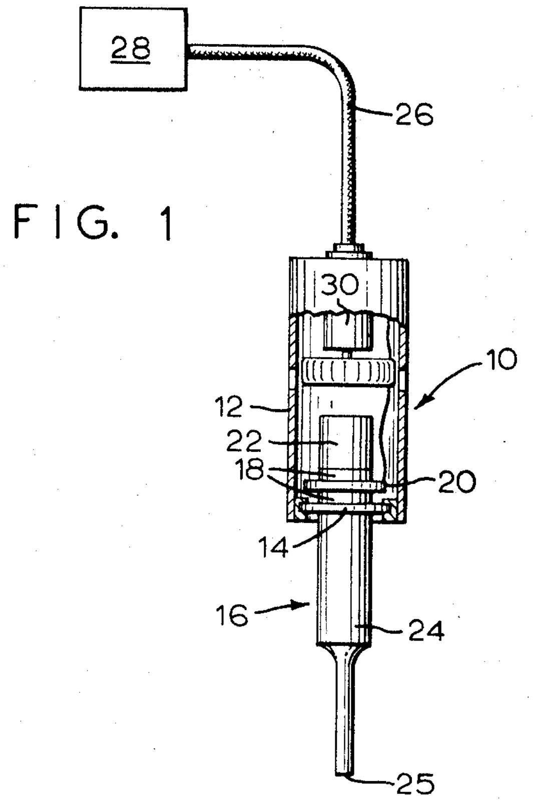
FIGURE 1 is a schematic front view, partially sectioned, of an electro-acoustic power converter.

Referring now to the figures and FIGURE 1 in particular, numeral 10 identifies a high power electro-acoustic converter which when suitably energized provides ultrasonic energy, typically at a frequency of 20 kilocycles per second. The converter comprises a metal casing 12 supporting a perforated metal vent plate 14 which is integral with the transducer system, generally indicated at 16. The transducer system is bolted together and comprises a pair of piezoelectric disks 18 separated by a metal plate 20. The piezoelectric disks 18 are backed by a massive metal back plate 22 and are coupled to a sonic energy impedance transformer 24, commonly called a horn. Electrical energy is supplied to the transducer system by a cable 26 which receives its power from an electrical high frequency source 28. The converter includes also a cooling fan 30 for cooling the transducer system 16. When the high frequency power is applied to the piezoelectric disks 18, e.g. barium titanate or lead zirconate titanate, the electrical energy is converted to mechanical vibration, causing the tip of the horn 24 to oscillate in a longitudinal direction.

For welding purposes, the frontal surface 25 of the horn is brought into contact with a workpiece whereby sonic energy is transferred thereto. For homogenizing a liquid mixture, the frontal portion of the horn is immersed in the particular mixture.

Figure 2:
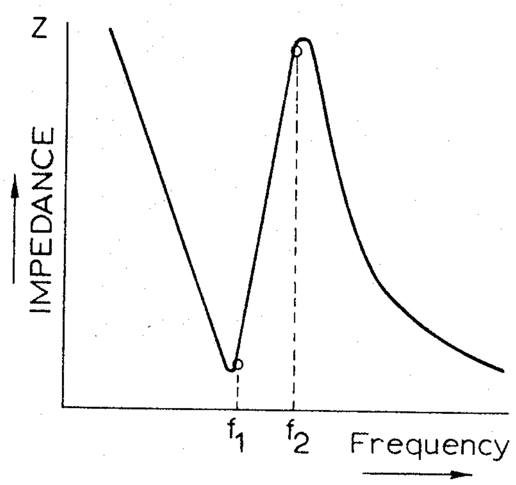
FIGURE 2 is a schematic diagram of impedance versus frequency for the electro-acoustic converter per FIGURE 1.

When a converter of the type described is driven from a variable frequency source, the electrical impedance of the converter versus frequency is indicated by a graph as shown in FIGURE 2. The graph shows a sharp knee at which the converter, while resonating mechanically, exhibits minimum electrical impedance. The converter may be operated at or near this frequency, for instance the frequency $f_1$ and, in fact, this is the usual point of operation. As the frequency is increased, a second knee is reached at which the converter is resonating and exhibits maximum impedance, and the converter may be operated at or near this frequency, for instance the frequency $f_2$. In accordance with this disclosure, this second knee, the area at which the resonating converter exhibits high electrical impedance, is of interest. It is the open circuit resonant frequency condition, or the frequency of parallel resonance. The points of mechanical resonance are determined by the converter's construction as described for instance in the book "Sonics" by T. F. Hueter and R. H. Bolt, John Wiley & Sons, Inc. New York (1955), chapter 4.

Figure 3:
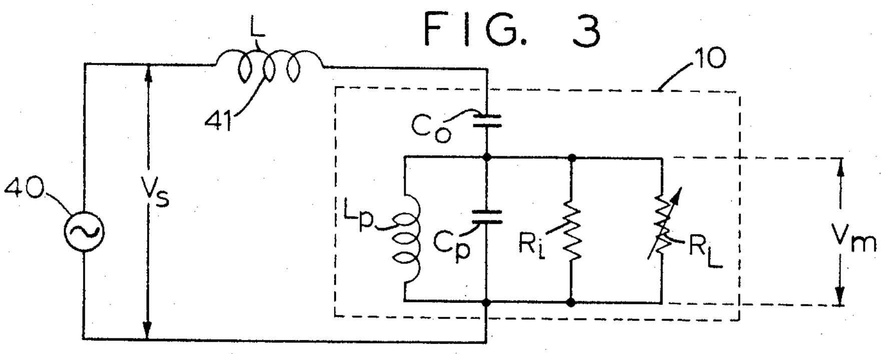
FIGURE 3 is a schematic electrical circuit diagram showing the converter equivalent circuit as it may be represented in the vicinity of the desired mechanical resonance.

The equivalent electrical circuit of the converter 10 operating in the region of the frequency $f_2$ of FIGURE 2 can be depicted by the diagram per FIGURE 3. The circuit comprises the combination of a motion independent clamped capacitance $C_o$ and the parallel connection of an inductance $L_p$, a capacitance $C_p$, a substantially constant internal resistance $R_i$, and a variable load impedance $R_L$ which equals 1/mechanical resistance where resistance equals force divided by velocity. It will be understood that these components are "equivalent" value circuit elements, simulating the electrical characteristics of the transducer in the vicinity of the desired mechanical resonance.

At resonance frequency $f_2$, the inductive reactance produced by $L_p$ and the capacitive reactance generated by $C_p$ are equal. Moreover, in order to operate in the mode described, the external circuit inductance 41 must be selected to produce an inductive reactance $X_L$ which compensates the clamped capacitive reactance $X_{Co}$ exhibited by the converter 10.

Therefore, when at resonance the reactance value $X_L$ equals the value of $X_{Co}$, the voltage produced by the source 40 is applied effectively across the parallel connection of $L_p$, $C_p$, $R_i$, and $R_L$. Since the respective capacitive and inductive reactance cancel out, the supply voltage $V_s$ is applied across the resistive components. The quantity $R_i$ remains substantially constant. Thus, the supply voltage $V_s$ is effective upon the load resistance $R_L$ as $V_m$, the motional dependent voltage, and if the source 40 is a constant voltage supply with sufficient current capacity, the power delivered by the source 40 will vary in response to the value of $R_L$, whereas the power dissipated by the converter and represented by the value of $R_i$ remains constant.

The arrangement shown in FIGURE 3 has several distinct advantages in that the electric power from the source 40 is supplied at constant voltage and, therefore, can be readily derived from the normal power line which provides substantially constant voltage with a fair degree of regulation. Another desirable feature of the circuit resides in the requirement of an inductance 41 connected in series with the source 40. This enables the use of a true switch (full ON-full OFF) as the source 40, which is particularly advantageous for efficient utilization of semiconductor devices. Since the inductance 41 suppresses higher harmonics of the current, the circuit will produce nearly sinusoidal current for the square wave voltage input, which condition improves with an increase in mechanical loading.

Figure 4:
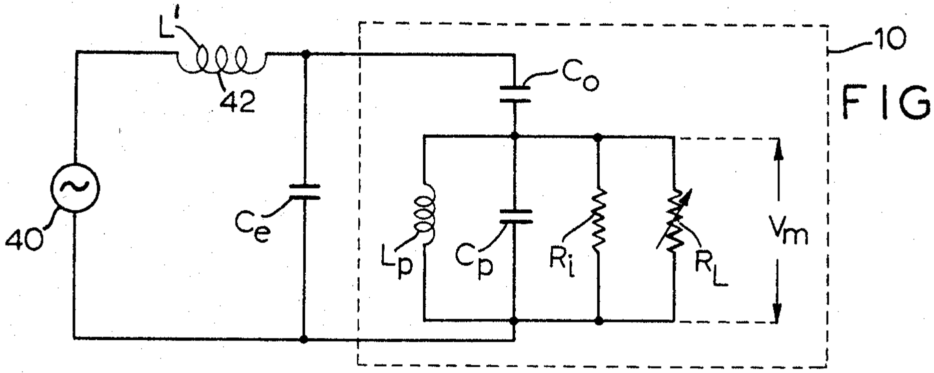
FIGURE 4 is a schematic electrical circuit diagram similar to FIGURE 3 showing a modification.
Figure 5:
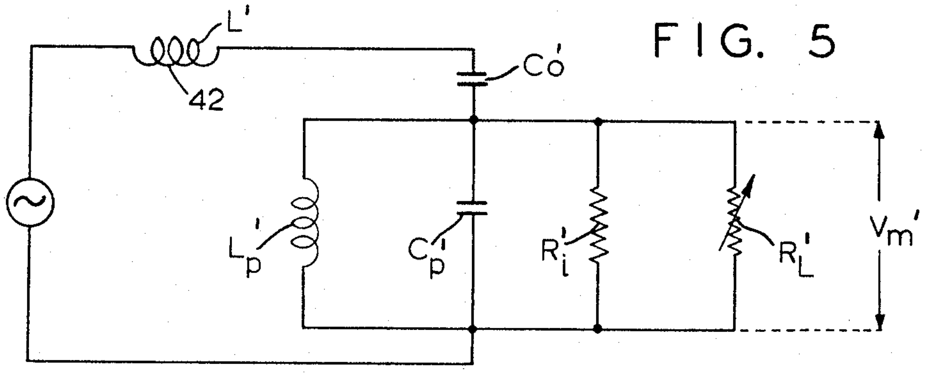
FIGURE 5 is a representation of the equivalent circuit per FIGURE 4.

An objectionable feature of operating a converter of the type described at parallel resonance is the relatively high voltage which may appear across the converter. In a typical case, such voltage may exceed 2,000 volts R.M.S. and may make the operation at parallel resonance entirely impractical. In order to reduce the voltage, additional electrical capacitance is added to the circuit, such capacitance being connected in parallel with the converter 10 as shown in FIGURE 4 wherein a capacitor $C_e$ is connected in parallel with the converter. The equivalent circuit for this modified circuit is shown in FIGURE 5. The capacitor $C_e$, FIGURE 4, when considered as a part of the load, has the effect of reducing the original motional voltage $V_m$ by a factor of $$\frac{C_o}{C_o+C_e}$$

without altering the configuration of the equivalent circuit of the converter. This reduced voltage is identified as $V_m'$. The values of $C_p$, $L_p$, $R_i$ and $R_L$ in the original circuit are reduced by the factor $$\left(\frac{C_o}{C_o+C_e}\right)^2$$

becoming $L_p'$, $C_p'$, $R_i'$ and $R_L'$. The new equivalent capacitor $C_o'$, FIGURE 5, becomes the sum of $C_o+C_e$ and the inductance 42 or $L'$ is decreased correspondingly to cause at the frequency of parallel resonance an inductive reactance $X_L'$ to equal the capacitive reactance $X_{Co}'$, the latter being equal to:

$$\frac{X_{Co}\times X_{Ce}}{X_{Co}+X_{Ce}}$$

The inherent consequence of adding a capacitor in parallel with the converter is an increase in the electrical Q of the circuit when an external inductance is used in series with the converter. Since, in order to discriminate against undesirable modes of oscillation, some selectivity is desired, this effect is not objectionable and in most cases is helpful. In a typical case, even at maximum loading, the mechanical Q will be higher than the electrical Q by a factor of five or more.

Figure 6:
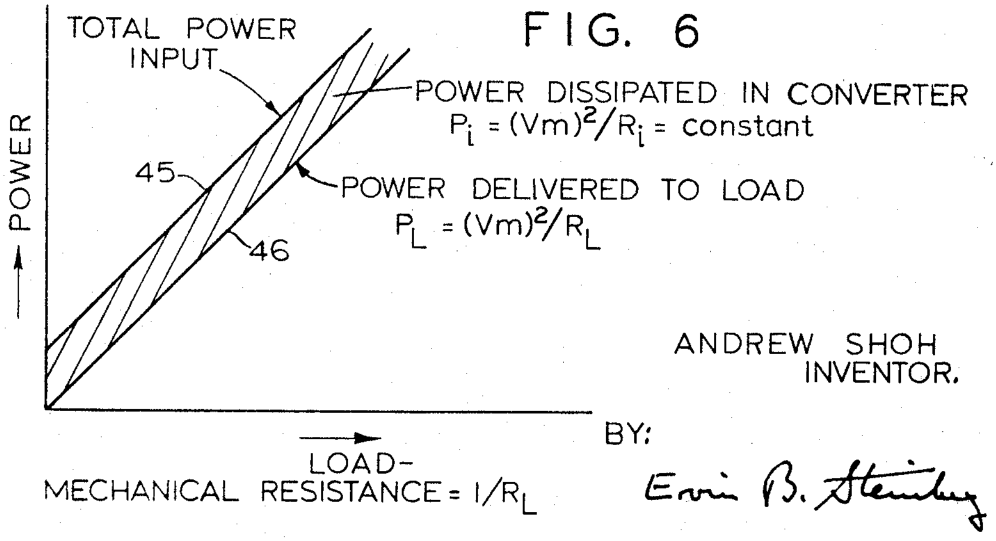
FIGURE 6 is a graph of power versus the mechanical resistance of the load when operating the converter as shown in FIGURES 3 and 4.

The power delivered to the load versus input power using the circuits per FIGURES 3 and 4 is shown in FIGURE 6. The total input power for various mechanical resistance of the load ($1/R_L$) is shown by the line 45. The line 46 indicates the output power delivered to the load. The vertical distance between the two lines is the power dissipated in the converter $(V_m)^2/R_i$ which, as is clearly evident, remains constant despite changing values of mechanical load resistance. Therefore, the power dissipated by the converter remains within safe limits, while the circuit is capable of delivering increasing power to the load as the mechanical resistance presented to the horn's frontal surface increases.

Figure 7:
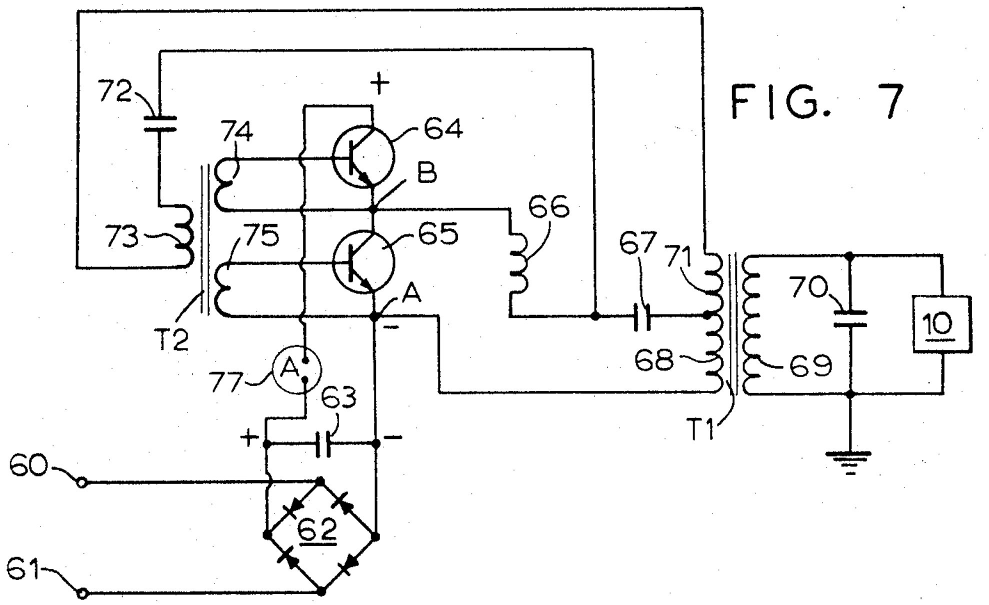
FIGURE 7 is a schematic circuit diagram of the oscillatory circuit for operating the converter.

A practical embodiment of an oscillatory circuit for driving an electro-acoustic converter at parallel resonance using the principles described is shown in FIGURE 7. The Driving circuit portion of the oscillatory circuit includes a bridge rectifier 62 and a filter capacitor 63 adapted to receive alternating current power via terminals 60 and 61 and delivering direct current output to a set of switching transistors 64 and 65 which, in turn, are connected to deliver power to the series connection of an inductance 66, a capacitor 67 and the primary winding 68 of a transformer T1. The load circuit includes a secondary winding 69 of the transformer T1, the electro-acoustic converter 10 and the parallel capacitor 70. The feedback portion of the oscillatory circuit includes the winding 71 in the primary side of the transformer T1, the capacitor 67, a direct current blocking capacitor 72, and a transformer T2 having a primary winding 73 and two secondary windings 74 and 75.

For oscillation the inductance 66 is dimensioned so that it provides an inductance reactance which at parallel resonance compensates the capacitive reactance of the capacitor 67 and the capacitive reactance of the load circuit as reflected in the driving circuit, i.e. on the primary side of the transformer T1. The capacitor 67 is selected to provide to the transformer winding 73 a feedback signal which is substantially in phase with the resistive voltage component across the converter 10 and, therefore, provides a capacitive reactance which compensates the apparent capacitive reactance of the load circuit, particularly the capacitive reactance created by the clamped capacity $C_o$ plus the reactance of the external capacitor 70 if such an external capacitor is used. The capacitor 72 in the feedback circuit blocks the flow of direct current, providing the alternating current signal to the switching transistors 64 and 65. Also, the feedback signal is selected to be of sufficient amplitude to cause the transistors to operate in their saturated mode for one-half of the cycle of the parallel resonant frequency.

Operation of the circuit may be visualized from the following description: The positive terminal of the direct current supply via the switching transistor 64 and the terminal B charges the capacitor 67 through the impedance 66 and the series connected transformer winding 68. Subsequently, the capacitor 67 discharges through the impedance 66, the terminal B, switching transistor 65, terminal A, and the transformer winding 68. The entire circuit is in oscillation because the capacitive reactance of the load circuit and that of the driving circuit resonate with the inductive reactance of driving circuit. The transformer winding 71 develops a feedback signal of the same frequency, the signal being phase shifted by the capacitor 67 for causing it to be substantially in phase with the resistive current component of the load circuit, and applied via a direct current blocking capacitor 72 to the transformer winding 73 of the feedback transformer T2. The secondary windings 74 and 75 of this transformer provide a driving signal to the switching transistors 64 and 65 in order to synchronize the operation of the pulses of energy with the parallel resonance frequency. Since the current drawn from the rectifier 62 is directly related to the power delivered to the load, an ampere meter 77 inserted in the direct current line provides an indication of the power delivered to the load. It may be observed that the capacitor 67 serves a triple function, namely blocking the flow of direct current, supplying a capacitive reactance for bringing the feedback signal in phase with the resistive component of the converter, and also increasing the Q of the resonant circuit.

Figure 8:
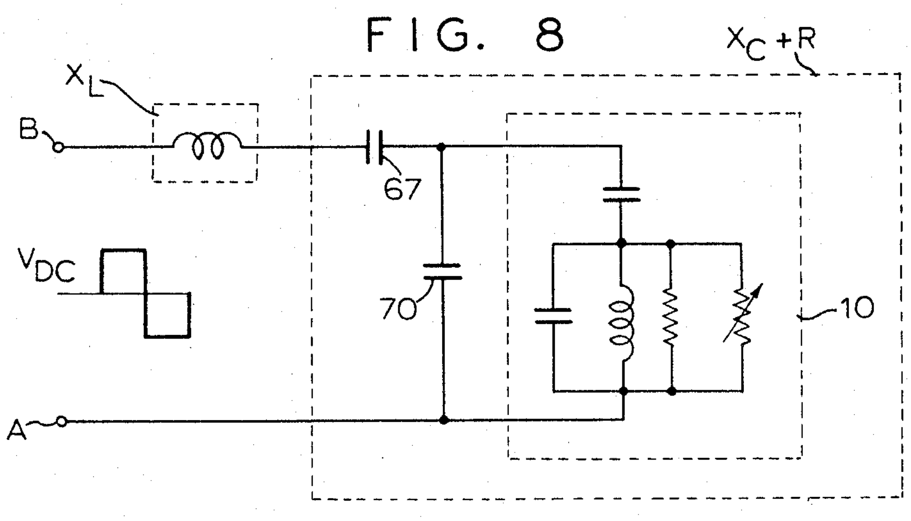
FIGURE 8 is a schematic circuit diagram showing the equivalent circuit applicable to FIGURE 7.

FIGURE 8 shows the equivalent resonant electrical circuit referred to terminals A and B in FIGURE 7, omitting the feedback portion.

Figure 9:
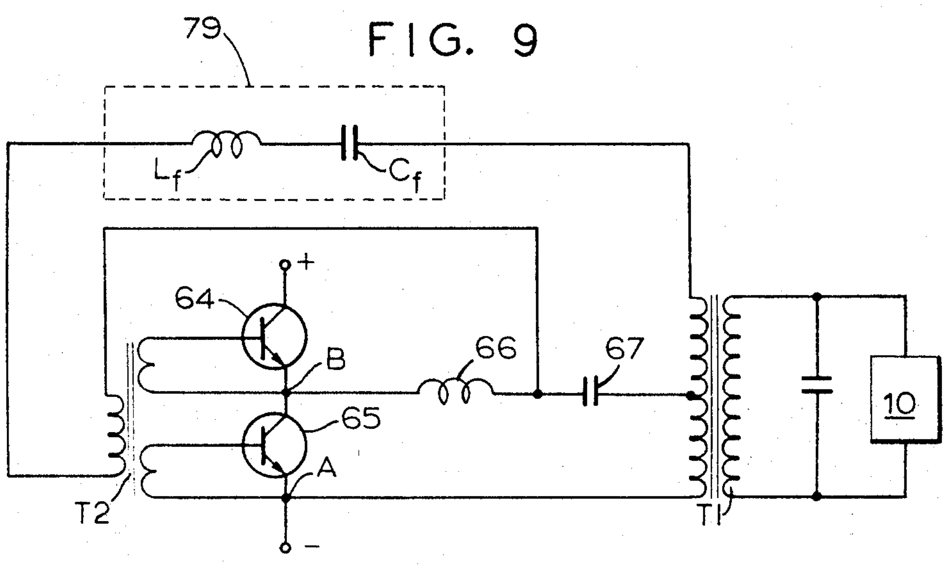
FIGURE 9 is a modified electrical circuit diagram similar to FIGURE 7.

FIGURE 9 is a circuit similar to FIGURE 7 except that a series resonant circuit 79 is introduced in the feedback circuit. The capacitor $C_f$, inductance $L_f$ and the transistor input impedance, referred to the primary side of the feedback transformer, constitute a series resonant circuit at the frequency of the desired transducer resonance. Typically, this circuit is tuned for a slight lead in input signal to compensate for the small delay in transistor switching. This circuit provides improved frequency selectivity and is preferred when sufficient selectivity by increasing the Q of the power circuit cannot conveniently be achieved.

Figure 10:
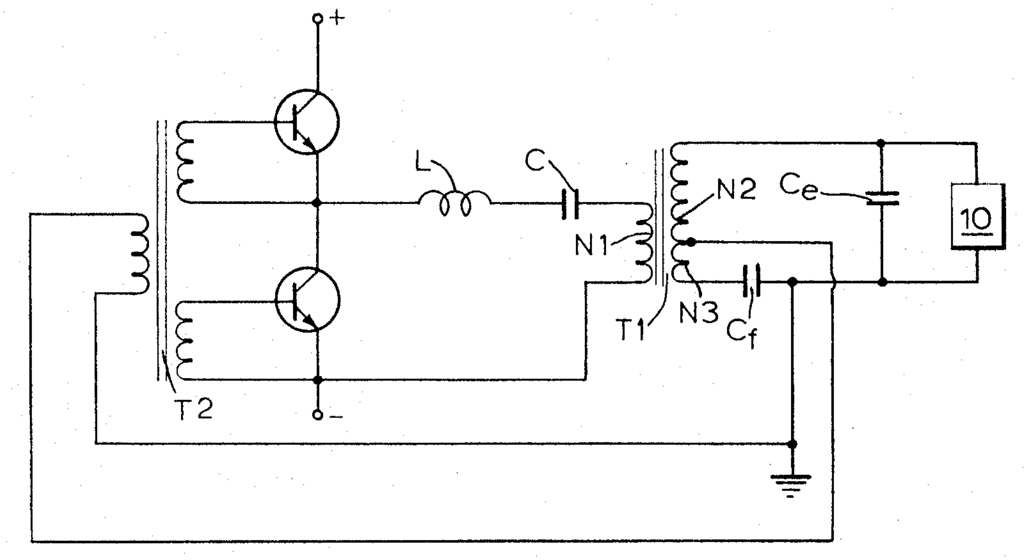
FIGURE 10 is a schematic electrical circuit diagram showing a further alternative design.

FIGURE 10 is a circuit substantially similar to that described in FIGURE 7 except that the feedback signal is derived from a winding N3 on the secondary side of the power transformer T1 and the phase angle of the feedback signal is corrected by the capacitor $C_f$ in the feedback signal circuit.

Figure 11:
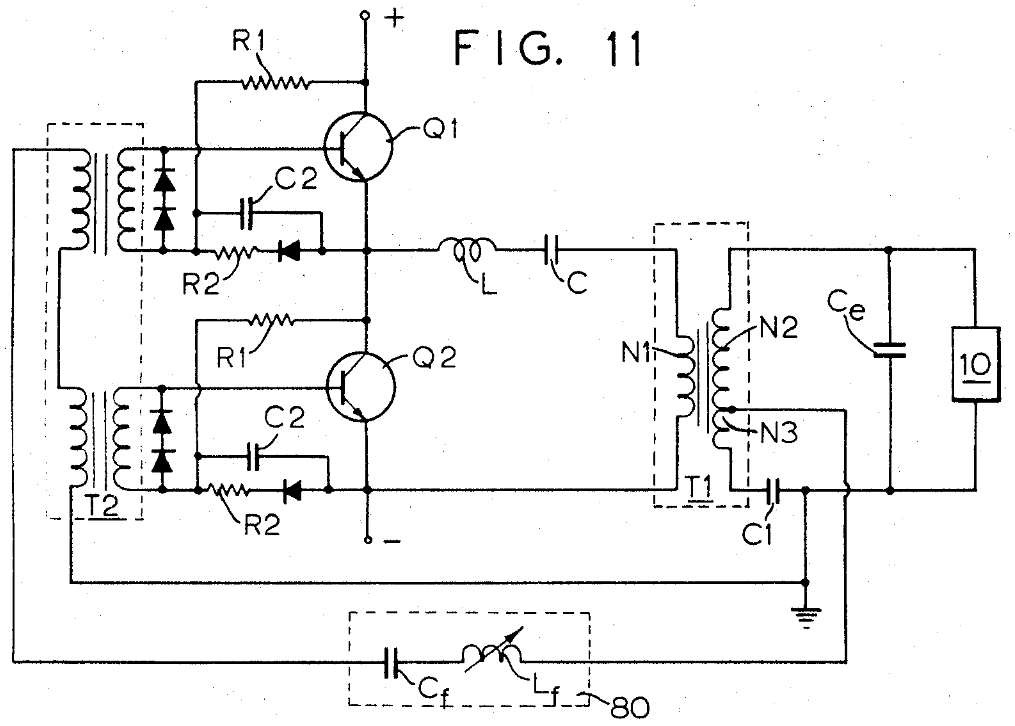
FIGURE 11 is a schematic electrical circuit diagram similar to FIGURE 10, showing a modification of the circuit.

FIGURE 11 is a modified circuit per FIGURE 10, using a series resonant circuit 80 in the feedback signal path, similar to FIGURE 9, thereby providing more frequency selectivity as has been explained. Also the circuit shows the biasing components for the base electrode of the switching transistors.

In a practical embodiment, the typical circuit components are as follows:

| | |
|---|---|
| Converter **10** | Branson Instruments, Inc., "Sonifier" Model J32, parallel resonant frequency $f_2$ =20 kHz. |
| Capacitor $C_e$ | 0.0072 mfd. |
| Transformer T1 | N1=8 turns; N2=118 turns; N3=2 turns. |
| Transformer T2 | Primary windings — 20 turns each; secondary windings—20 turns each. |
| Capacitor C | 1.0 mfd. |
| Inductance L | 95 μh. |
| Transistors Q1, Q2 | 2N3773. |
| Capacitor $C_f$ | 0.25 mfd. |
| Inductance $L_f$ | 340 μh. |
| Capacitor C1 | 0.634 mfd. |
| Resistor R1 | 4,000 ohms. |
| Resistor R2 | 0.5 ohms. |
| Capacitor C2 | 100 mfd. |
| D-C voltage | 110 volts. |

Figure 12:
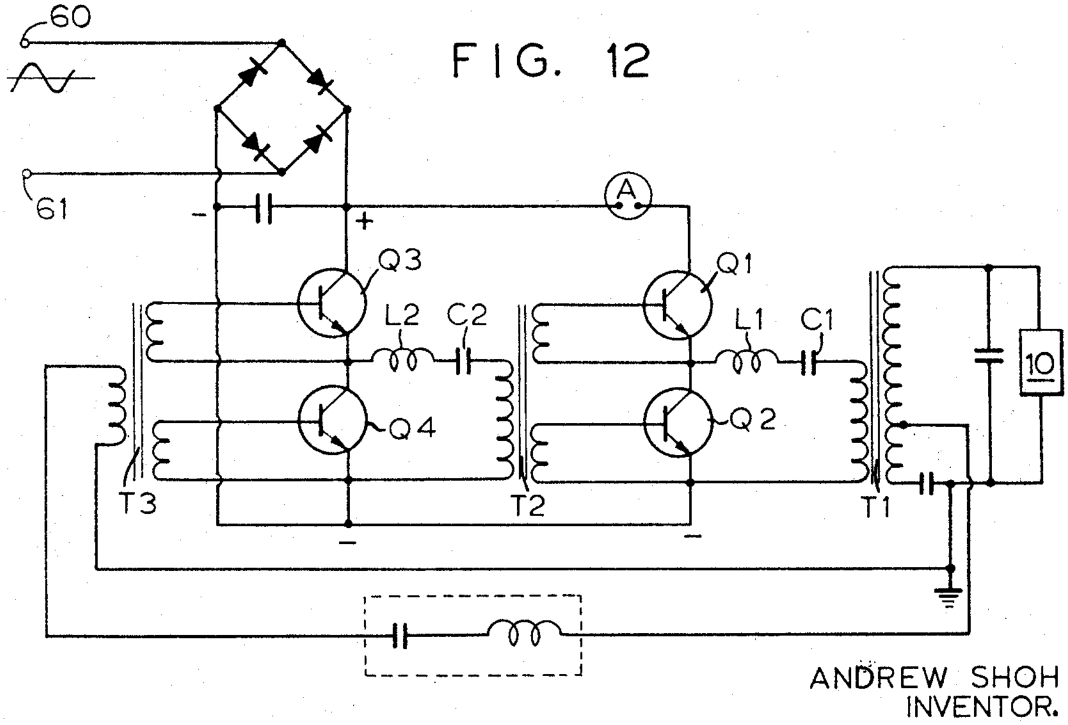
FIGURE 12 is a schematic electrical circuit diagram of still another embodiment.

FIGURE 12 depicts a two stage driving circuit which is particularly suitable for heavily loaded conditions when more gain is required than that which is available from a single transistor stage. The circuit per FIGURE 11 is expanded into two driving stages. The first stage comprises the transformer T3, transistors Q3 and Q4, the inductance L2, capacitance C2, and the primary winding of the transformer T2. The second stage comprises the transistors Q1 and Q2, the inductance L1, capacitance C1, and the primary winding of the transformer T1. The feedback signal is developed across a secondary winding of the output transformer T1 and is fed to the first input stage. The values of L2 and C2 are selected to compensate the reactance components of L1 and C1 as reflected in the first driving stage.

It will be apparent that the circuits described hereinabove are characterized by extreme simplicity, and that ultrasonic converters of the type described can be operated from main power lines without the need for special constant voltage or current regulation as has been needed heretofore in order to obtain similar results.

While there have been described and illustrated several specific embodiments of the invention and certain modifications thereof, it will be apparent that still other and further changes may be made without deviating from the broad principles and scope of this invention.

What is claimed is:

1. An oscillatory circuit for driving an electro-acoustic converter substantially at parallel resonance comprising:

a load circuit including an electro-acoustic converter having a predetermined natural frequency of oscillation and said load circuit exhibiting a capacitive reactance at said natural frequency;

a driving circuit coupled to said load circuit and including a source of direct current, a switching means for providing pulses of energy from said source, and the series connection of an inductance and a capacitance; said inductance providing an inductive reactance which substantially at the parallel resonance frequency of the converter equals the capacitive reactance of said driving circuit and of said load circuit reflected in said driving circuit, and a feedback circuit coupled to said switching means for applying thereto an alternating current signal which substantially is in phase with the resistive voltage component across the converter.

2. An oscillatory circuit as set forth in claim 1 wherein said load circuit and said driving circuit are coupled to one another by a transformer, and said feedback circuit includes a winding on said transformer.

3. An oscillatory circuit as set forth in claim 1 wherein said load circuit and said driving circuit are coupled to one another by a transformer; said feedback circuit includes a winding on said transformer serially connected with a capacitive means, whereby said winding provides the alternating current feedback signal and said capacitive means provides a capacitive reactance to cause the feedback signal to be substantially in phase with the resistive voltage component across the converter.

4. An oscillatory circuit as set forth in claim 1 wherein said load circuit and said driving circuit are coupled to one another by a transformer; said feedback circuit includes a winding on said transformer for providing the alternating current signal and includes also a capacitive means for providing a capacitive reactance for causing the feedback signal to be substantially in phase with the resistive voltage component across the converter, said switching means includes transistor means which responsive to said feedback signal are operated substantially in their saturated mode for one-half of the cycle of said parallel resonance frequency.

5. An oscillatory circuit as set forth in claim 4 wherein said feedback circuit includes a direct current blocking means and said feedback signal is coupled to said transistor means by a transformer.

6. An oscillatory circuit as set forth in claim 1 wherein said load circuit includes a capacitance coupled in parallel with the converter.

7. An oscillatory circuit for driving an electro-acoustic converter substantially at its parallel resonant frequency comprising:

a load circuit including an electro-acoustic converter having a predetermined natural frequency of oscillation and said load exhibiting a capacitive reactance at said natural frequency;

transformer means having one winding coupled to said load circuit and another winding coupled to a driving circuit;

said driving circuit including a source of direct current, semiconductor switching means for providing pulses of energy from said source, and the series connection of an inductance and a capacitance, said inductance providing an inductive reactance which, when the converter is resonating substantially at its parallel resonant frequency, substantially compensates the capacitive reactance of said driving circuit and that of said load circuit reflected in said driving circuit, and a feedback circuit, which includes a further winding on said transformer and a capacitive means for providing a capactive reactance, transformer-coupled to said semiconductor switching means for applying thereto an alternating current signal which is in phase with the resistive voltage component across the converter.

8. An oscillatory circuit as set forth in claim 7 wherein said winding forming a part of said feedback circuit is disposed on the transformer side which is coupled to said driving circuit.

9. An oscillatory circuit as set forth in claim 7 wherein said winding forming a part of said feedback circuit is disposed on the transformer side which is coupled to said load circuit.

10. An oscillatory circuit as set forth in claim 7 wherein said feedback circuit includes additionally a resonant circuit tuned to said parallel resonant frequency of said converter.

11. An oscillatory circuit as set forth in claim 10 wherein said resonant circuit in said feedback circuit is a series resonant circuit, and said feedback signal has a slightly leading phase angle relative to the resistive voltage component applied across said converter whereby to provide compensation for the time delay of said transistor switching means.

12. An oscillatory circuit as set forth in claim 7 wherein said parallel resonant frequency of said converter is in the ultrasonic frequency range.

13. An oscillatory circuit as set forth in claim 7 wherein said semiconductor switching means comprises a pair of transistors.

14. An oscillatory circuit for driving an electro-acoustic converter substantially at parallel resonance comprising:

a load circuit which includes the secondary winding of a transformer connected to an electro-acoustic converter having a piezoelectric transducer for converting high frequency electric energy applied thereto to sonic energy and exhibiting a capacitive reactance when operated at its parallel resonance frequency;

a driving circuit coupled to said load circuit and including the primary winding of said transformer, the series connection of an inductance and a capacitance, and a switching means adapted to supply pulses of unidirectional energy from a direct current source to said driving circuit, said inductance providing an inductive reactance which, at the desired substantially parallel resonant frequency condition of said converter, substantially equals the capacitive reactance of said driving circuit and the capacitive reactance of said load circuit as reflected in said driving circuit, and a feedback circuit which includes a tertiary winding on said transformer coupled serially with a capacitance to said switching means, the capacitance in said feedback circuit being selected to cause said feedback signal to be substantially in phase with the resistive voltage component across said converter.

15. An oscillatory circuit as set forth in claim 14 wherein said direct current source is coupled with its input to an alternating current source and said switching means comprises a pair of transistors.

16. An oscillatory circuit as set forth in claim 14 and including additionally a series resonant circuit comprising an inductance and a capacitance connected in said feedback circuit, said resonant circuit being tuned to the frequency at which said converter is operating.

17. An oscillatory circuit as set forth in claim 14 and including capacitive means coupled in parallel with said converter.

18. An oscillatory circuit for driving an electro-acoustic converter substantially at parallel resonance comprising:

a load circuit which includes an electro-acoustic converter having a piezoelectric transducer for converting high frequency electrical energy applied thereto to sonic energy and exhibiting a capacitive reactance when operated at its parallel resonance frequency;

a driving circuit coupled to said load circuit and including a first and a second stage;

said first and said second stage, each including a switching means adapted to supply pulses of unidirectional energy from a direct current source to the series combination of an inductance and a capacitance, whereby at the desired substantially parallel resonant frequency condition of said converter, said inductance provides an inductive reactance which compensates the capacitive reactance in the respective drive circuit and the reflected capacitive reactance;

transformer means for coupling said first stage to said second stage, and said second stage to said load circuit; and feedback means for providing a signal commensurate with the frequency at which said converter is operating to said first stage, and including capacitive means for causing the feedback signal supplied to said first stage to be substantially in phase with the resistive voltage component appearing across said converter.

19. An oscillatory circuit as set forth in claim 18 and including a capacitive means coupled in parallel with said converter.

20. An oscillatory circuit for driving an electro-acoustic converter substantially at parallel resonance comprising:

a load circuit including an electro-acoustic converter having a predetermined natural frequency of oscillation and said load circuit exhibiting a capacitive reactance at said natural frequency;

a driving circuit coupled to said load circuit and including a source of direct current, a switching means for providing pulses of energy from said source, and the series connection of an inductance and a capacitance; said inductance providing an inductive reactance which substantially at the parallel resonance frequency of the converter equals the capacitive reactance of said driving circuit and of said load circuit reflected in said driving circuit;

a feedback circuit coupled to said switching means for applying thereto an alternating current signal which substantially is in phase with the resistive voltage component across the converter, and means connected for measuring the flow of direct current from said source of direct current, said current being indicative of the power delivered to said load circuit.

References Cited

UNITED STATES PATENTS

| | | | |
|---|---|---|---|
| 2,752,512 | 6/1956 | Sarratt | 310—8.1 |
| 2,799,787 | 7/1957 | Guttner | 310—8.1 |
| 2,872,578 | 2/1959 | Kaplan | 250—36 |
| 2,917,691 | 12/1959 | Prisco | 318—118 |
| 3,152,295 | 10/1964 | Schebler | 318—118 |
| 3,223,907 | 12/1965 | Block | 318—118 |
| 3,296,511 | 1/1967 | Burgt | 318—116 |
| 3,379,972 | 4/1968 | Foster | 324—61 |

J. D. MILLER, *Primary Examiner.*

U.S. Cl. X.R.

318—118, 116; 324—61; 310—9